US008075197B2

(12) United States Patent
Chen

(10) Patent No.: US 8,075,197 B2
(45) Date of Patent: Dec. 13, 2011

(54) FIBER OPTIC CONNECTOR AND FIBER OPTIC ASSEMBLY HAVING SAME

(75) Inventor: Hsiang-Hung Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 95 days.

(21) Appl. No.: 12/764,099

(22) Filed: Apr. 21, 2010

(65) Prior Publication Data

US 2011/0116746 A1    May 19, 2011

(30) Foreign Application Priority Data

Nov. 13, 2009   (CN) .......................... 2009 1 0309660

(51) Int. Cl.
G02B 6/38 (2006.01)
(52) U.S. Cl. ................ 385/74; 385/33; 385/52; 385/53; 385/62; 385/65; 385/73; 385/81; 385/83; 385/88; 385/89; 385/92; 385/93; 385/139
(58) Field of Classification Search .................... 385/33, 385/52–53, 62, 65, 73–74, 81, 83, 88–89, 385/92–93, 139
See application file for complete search history.

(56) References Cited

U.S. PATENT DOCUMENTS

| 2,283,398 | A * | 5/1942 | Van Deventer | 439/120 |
| 3,637,284 | A * | 1/1972 | Plyler | 385/81 |
| 2003/0012520 | A1* | 1/2003 | Rogge et al. | 385/88 |
| 2007/0087614 | A1* | 4/2007 | Huch et al. | 439/352 |
| 2008/0199163 | A1* | 8/2008 | Ranish et al. | 392/407 |
| 2009/0239406 | A1* | 9/2009 | Amidon | 439/353 |
| 2009/0305572 | A1* | 12/2009 | Takamoto et al. | 439/660 |

* cited by examiner

Primary Examiner — Brian M. Healy
Assistant Examiner — Guy Anderson
(74) Attorney, Agent, or Firm — Altis Law Group, Inc.

(57) ABSTRACT

An exemplary fiber optic connector includes four converging lenses and a main body. The main body includes a first surface and a opposite second surface. The first surface defines four receiving holes for receiving four optical fibers. The converging lenses are arranged on the second surface and align with the respective receiving holes. The second surface defines two receiving slots for fixedly receiving two fixing protrusions of a complementary fiber optic connector, as well as two buffer slot. The two buffer slots each are located between the converging lens and the receiving slot, and are configured for allowing two portions of the main body to be bendable, such that precise alignment of the converging lens and the receiving slot is maintained.

20 Claims, 4 Drawing Sheets

FIBER OPTIC CONNECTOR AND FIBER OPTIC ASSEMBLY HAVING SAME

BACKGROUND

1. Technical Field

The disclosure generally relates to fiber optic connectors, and particularly relates to a fiber optic connector for connecting to another fiber optic connector to cooperatively couple optical signals between optical fibers.

2. Description of Related Art

A fiber optic connector 10 of a related art is used to couple a number of optical fibers 12. As shown in FIG. 4, the connector 10 includes two opposite ends. One end of the connector 10 is connected to the fibers 12, and the other end of the connector 10 is connected to a number of first converging lenses 16. The first converging lenses 16 align with the respective fibers 12. The connector 10 defines a number of fixing holes 18 and a number of receiving holes 14 therein. In operation of the connector 10, an electronic device, such as a Universal Serial Bus (USB) 20 used in a computer is provided, and the connector 10 is connected to the USB 20. The USB 20 may for example include a number of second converging lenses 26, and a number of fixing protrusions 28. The fixing protrusions 28 are inserted into the respective fixing holes 18. Each of the fibers 12 coaxially aligns with a corresponding first converging lens 16, and a corresponding second converging lens 26 along an axis T. Thereby, optical signals can be transmitted from the fibers 12 to the USB 20 through the first converging lenses 16 and the second converging lenses 26.

However, when the protrusions 28 are inserted into the respective fixing holes 18, stress may act between the connector 10 and the protrusions 28 of the USB 20 in the fixing holes 18 causing base material of the connector 10 around the fixing holes 18 to extrude. In such case, the first converging lenses 16 may be bendable relative to the axis T. Because of this, precise alignment of the first and the converging lenses 16, 26 is difficult to obtain during production and assembly, resulting in inferior quality products.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

An embodiment will now be described in detail below, with reference to the drawings.

Figure 1:
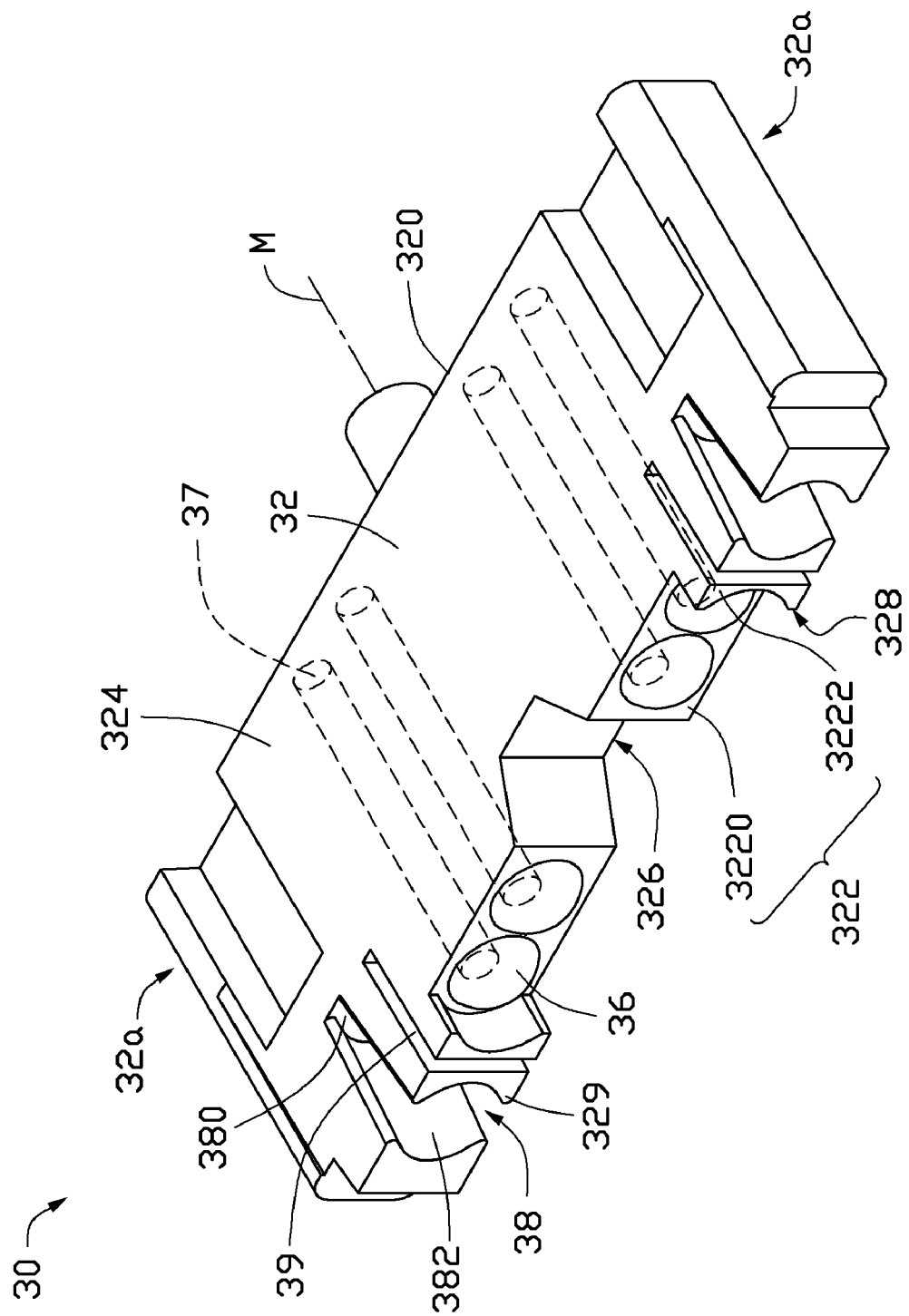
FIG. 1 is an isometric view of a fiber optic connector in accordance with an exemplary embodiment.

Referring to FIG. 1, a fiber optic connector 30 in accordance with an exemplary embodiment, includes a main body 32 and at least one converging lens 36.

The main body 32 defines a central axis M, and includes two body portions 32a at two opposite sides of the central axis M. The two body portions 32a are symmetrically opposite to each other across the central axis M. In addition, the main body 32 includes a first surface 320, a second surface 322, a third surface 324, and a fourth surface 326. The first and the second surface 320, 322 are located at two opposite sides of main body. Each of the third and the fourth surfaces 324, 346 is located between and adjoins the first and the second surfaces 320, 322. The third and the fourth surfaces 324, 346 are substantially parallel with one another.

The first surface 320 is substantially perpendicular to the central axis M, and has at least one receiving hole 37 defined therein. In this embodiment, the at least one receiving hole 37 includes four receiving holes 37. The four receiving holes 37 are parallel with the central axis M respectively. Two receiving holes 37 are defined at one body portion 32a, and the other two receiving holes 37 are defined at the other body portion 32a. In particular, the four receiving holes 37 are symmetrically opposite to each other across the central axis M.

The second surface 322 includes two first surface portions 3220 and two second surface portions 3222. The two first surface portions 3220 are coaxial with one another and spaced from one another at two opposite sides of the central axis M. The two second surface portions 3222 are coaxial with one another and spaced from one another at two opposite sides of the central axis M. The two first surface portions 3220 are near to the central axis M, while the two second surface portions 3222 are farther away from the central axis M. In particular, each of the first and the second surface portions 3220, 3222 are parallel with the first surface 320. The two second surface portions 3222 are located at a side of the first surface portions 3220 facing away from the first surface 320, thereby two steps 328 are formed between the first and the second surface portions 3220, 3222. In alternative embodiments, the second surface 322 can be a flat surface parallel with the first surface 320.

The number of the at least one converging lens 36 is same as that of the receiving holes 37. That is, the at least one converging lens 36 includes four converging lenses 36. In this embodiment, the receiving holes 37 are each a through hole that spans through the respective second surface portions 3222. The four converging lens 36 protrude from the second surface portions 3222, and align with the respective receiving holes 37. The connector 30 can be made of plastic using injection molding, and the converging lenses 36 are integrally connected to the main body 32. In alternative embodiments, each of the converging lenses 36 can be partially and fixedly received in a corresponding receiving hole 37. In other alternative embodiments, the receiving holes 37 can be blind holes and not extend all the way through the corresponding second surface portion 3222. In such case, the main body 32 and the converging lenses 36 can be made separately, and the converging lenses 36 can be connected to the main body 32 by applying adhesive between the main body 32 and the converging lenses 36.

Figure 2:
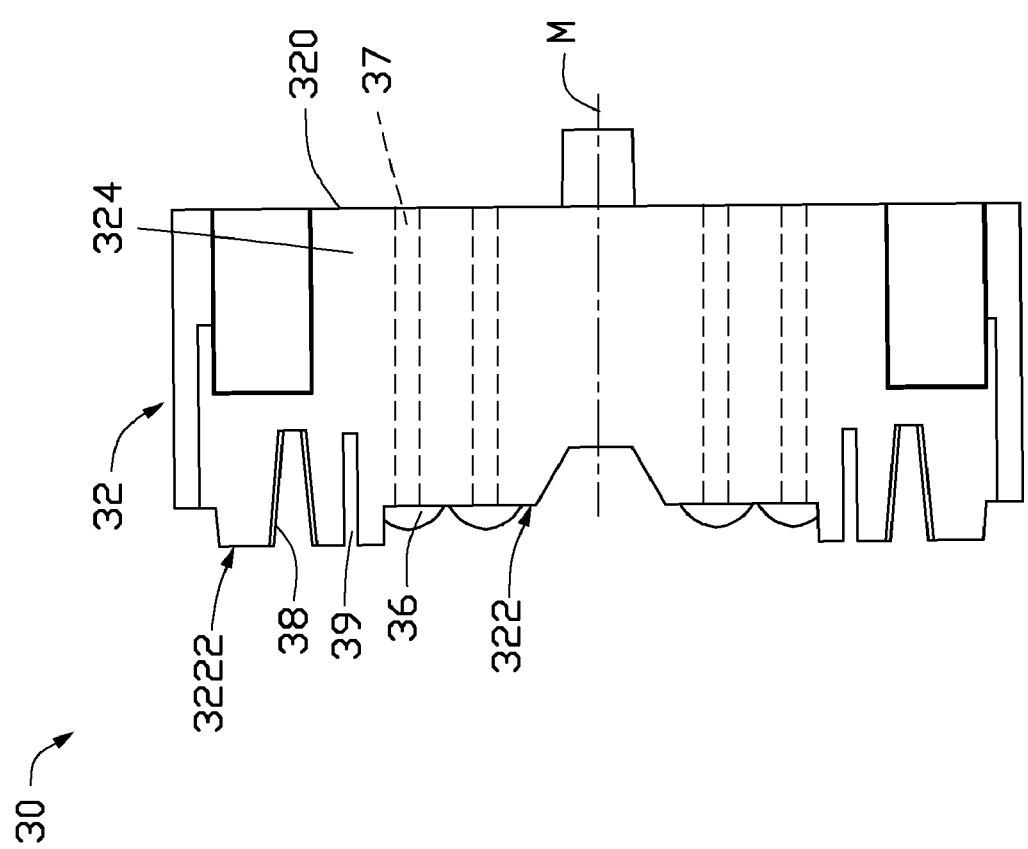
FIG. 2 is a top plan view of the fiber optic connector of FIG. 1.

Referring also to FIG. 2, the four receiving holes 37 are configured to fixedly receive four conventional optical fibers (not shown) respectively. Each of the receiving holes 37 can be generally rectangular or generally round. Provided the optical fibers can be fittingly received in the receiving hole 37, the shape of the fixing holes can be varied and remain within the scope of the disclosure.

The main body 32 further defines at least one receiving slot 38, and at least one buffer slot 39 in the second surface 322. In this embodiment, the at least one receiving slot 38 includes two receiving slots 38. The at least one buffer slot 39 includes two buffer slots 39. The two receiving slots 38 and the two buffer slots 39 are defined in the two second surface portions 3222 respectively. In particular, each second surface portion 3222 has a receiving slot 38 and a buffer slot 39 defined therein. Each of the receiving slots 38 is cylindrical shaped. In this embodiment, the receiving slot 38 has a frusto-conical shape. An inner surface (not label) in the receiving slot 38 includes a bottom surface 380 and a lateral surface 382. The lateral surface 382 adjoins the bottom surface 380 and the second surface portion 3222 (see FIG. 1). The receiving slot 38 tapers from the second surface portion 3222 to the bottom surface 380. In this embodiment, the receiving slot 38 spans through both the third surface 324 and the fourth surface 326.

The two receiving slot 38 are symmetrically opposite to each other across the central axis M. The two buffer slots 39 are also symmetrically opposite to each other across the central axis M. Each of the buffer slots 39 is located between the receiving slot 38 and the converging lens 36 at a same side of the central axis M (see FIG. 2). The buffer slots 39 span through both the third surface 324 and the fourth surface 326. A depth of the buffer slot 39 is substantially equal to that of the receiving slot 38. Alternatively, a depth of the buffer slot 39 may be greater that that of the receiving slot 38. In alternative embodiments, the two buffer slots 39 may be located between the corresponding receiving slot 38 and the corresponding converging lens 36 but not necessarily defined in the second surface portions 3222. Instead, the two buffer slots 39 can be defined in the first surface portions 3220.

It is noted, the number of the receiving holes 37, the converging lenses 16, the receiving slots 38, and the buffer slots 39 is not limited to the above illustrated embodiment. For example, the connector 30 including only one receiving hole 37, one converging lens 16, one receiving slot 38, and one buffer slot 39 should also be considered to be within the scope of the disclosure.

Figure 3:
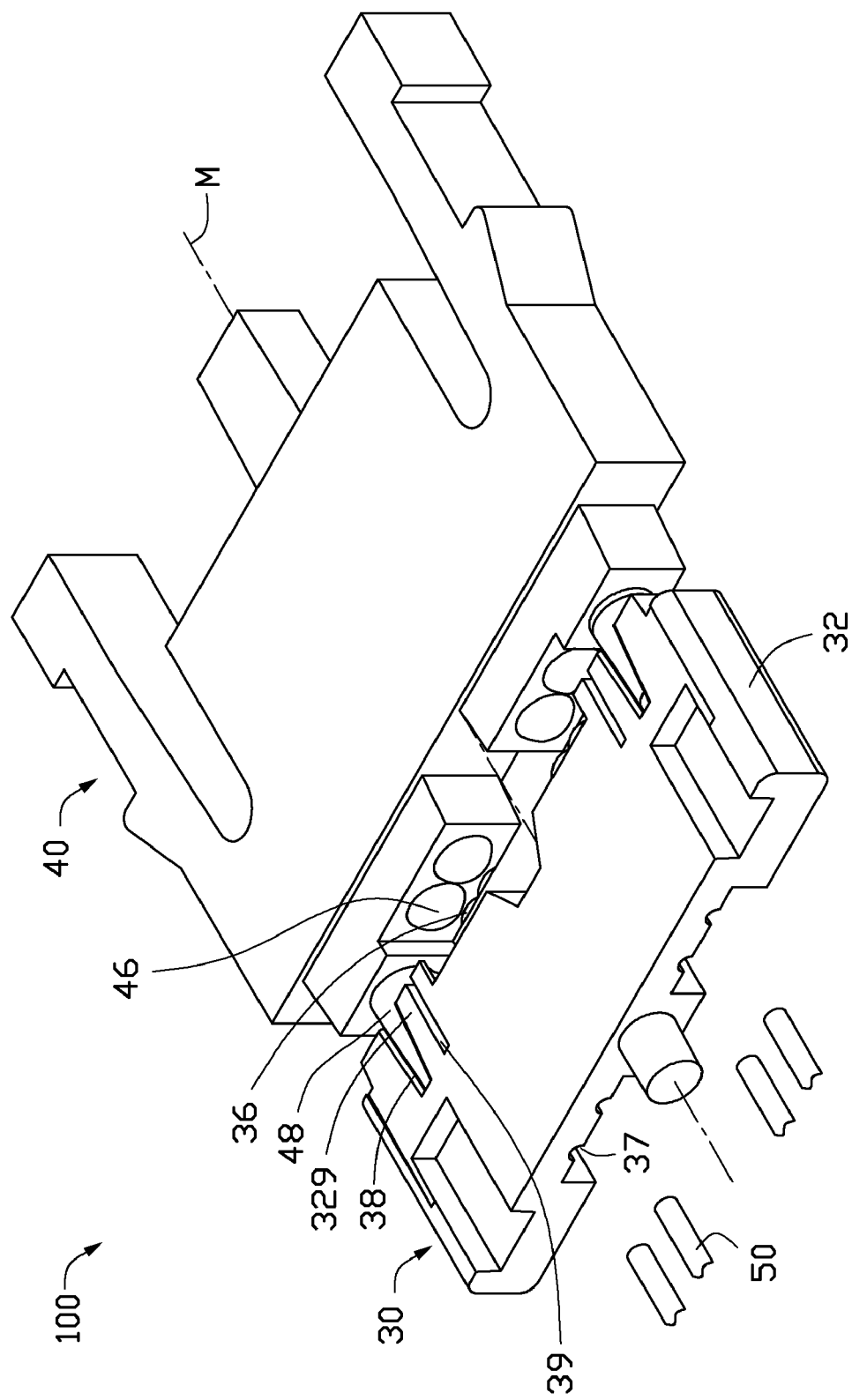
FIG. 3 is an isometric view of a fiber optic assembly with optical fibers, the fiber optic assembly including the fiber optic connector of FIG. 1.
Figure 4:
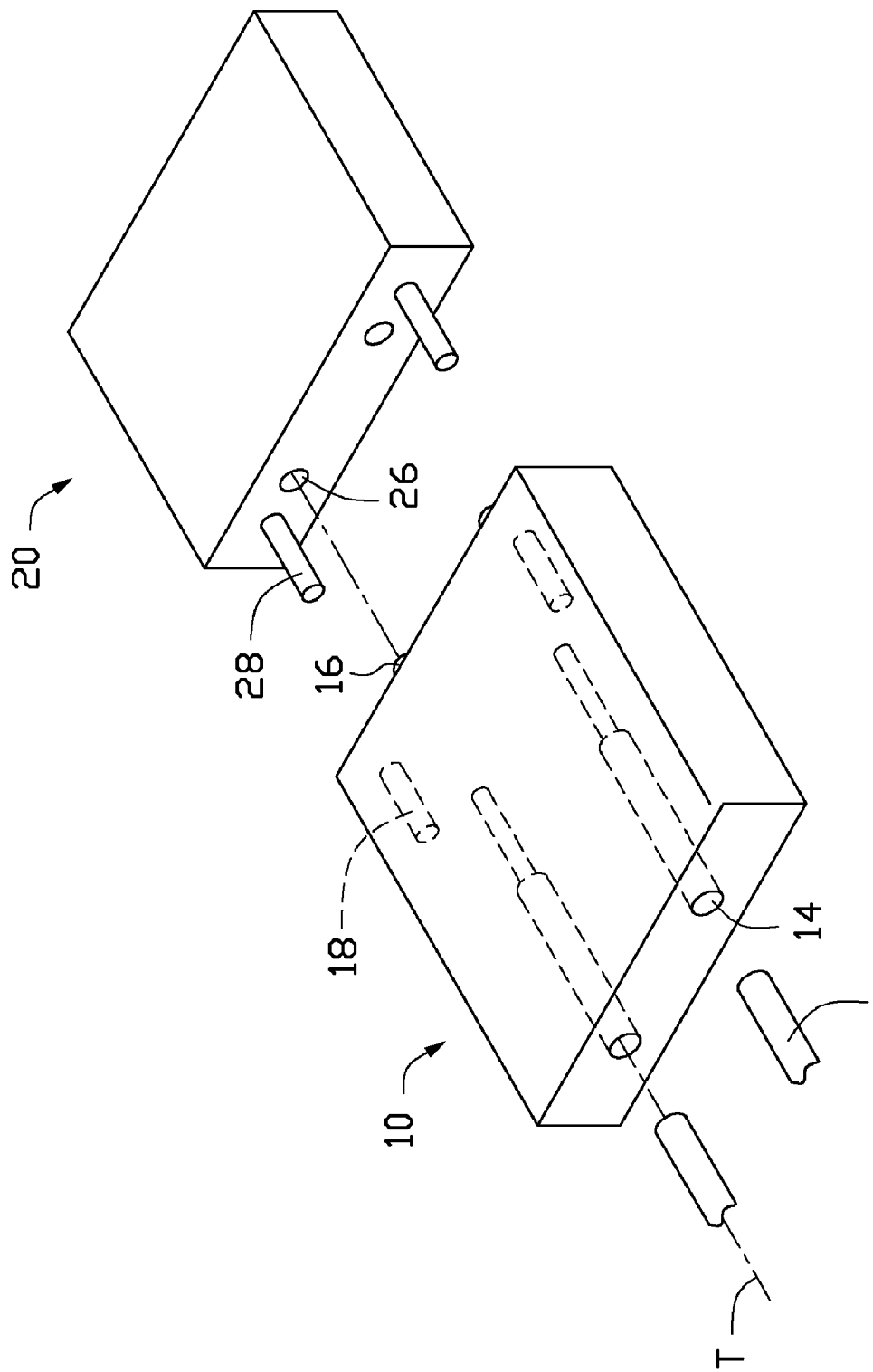
FIG. 4 is a schematic view of a typical fiber optic connector in use with optical fibers and a USB.

Referring to FIG. 3, a fiber optic assembly 100 using the connector 30 of FIG. 1 is shown. The fiber optic assembly 100 includes the connector 30, as well as a complementary fiber optic connector 40, and furthermore, four optical fibers 50. The complementary connector 40 may for example, be an USB 40 used in a computer. The USB 40 includes four second converging lenses 46, and two fixing protrusions 48. The connector 30 is connected to the complementary connector 40 by inserting the fixing protrusions 48 into the respective fixing slots 38 of the connector 30. A dimension (for example, a diameter) of each protrusion 48 is relatively greater than that of any fixing slot 38. Thus, the protrusions 48 can be interferentially received in the respective fixing slots 38. The fibers 50 are used to be fixedly received in the respective receiving holes 37. Thus, each of the fibers 50 coaxially aligns with a corresponding first converging lens 36, and a corresponding second converging lens 46. Thereby, optical signals can be transmitted from the fibers 50 to the USB 40 through the first converging lenses 36 and the second converging lenses 46.

One advantage of the connector 30 is that it has two buffer slots 39 defined therein, and each buffer slot 39 is located between the receiving slot 38 and the first converging lens 36. Thus, two portions 329 of the main body 32, each located between the buffer slots 39 and the receiving slot 38, may be bendable relative to the central axis M. In one typical example, when the fixing protrusions 28 of the USB 40 are interferentially received in the respective fixing slots 38, stress may act on the main body 32 in the fixing slots 38. The two portions 329 of the main body 32 may be extruded by the fixing protrusions 28 to be bendable towards the central axis M of the main body 32. In such case, the buffer slots 39 allow the two portions 329 of the main body 32 to be slightly bendable towards the central axis M without subsequently causing the first converging lenses 36 to be bendable towards the central axis M. In this way, precise positioning of the first converging lenses 36 and the fibers 50, as well as the second converging lenses 46 is ensured.

It is to be understood that the above-described embodiment is intended to illustrate rather than limit the disclosure. Variations may be made to the embodiment without departing from the spirit of the disclosure as claimed. The above-described embodiments illustrate the scope of the disclosure but do not restrict the scope of the disclosure.

What is claimed is:

1. A fiber optic connector for connecting to a complementary fiber optic connector, the complementary fiber optic connector comprising at least one fixing protrusion, the fiber optic connector comprising:

at least one converging lens;

a main body comprising a first surface and a second surface at two opposite sides thereof, the first surface defining at least one receiving hole for receiving at least one optical fiber, the at least one converging lens being arranged on the second surface and aligning with the at least one receiving hole, the second surface defining at least one receiving slot for fixedly receiving the at least one fixing protrusion and at least one buffer slot, the at least one buffer slot being located between the at least one converging lens and the at least one receiving slot, and being configured for allowing at least one portion of the main body between the at least one buffer slot and the at least one fixing hole to be bendable, such that precise alignment of the at least one converging lens and the at least one receiving slot is maintained.

2. The fiber optic connector of claim 1, wherein the main body further comprises a third surface and a fourth surface opposite to the third surface, each of the third surface and the fourth surface is located between and adjoins the first surface and the second surface, the at least one buffer slot spans through the third surface and the fourth surface.

3. The fiber optic connector of claim 2, wherein the at least one fixing slot spans through the third surface and the fourth surface.

4. The fiber optic connector of claim 1, wherein a depth of the buffer slot is substantially equal to that of the receiving slot.

5. The fiber optic connector of claim 1, wherein the receiving slot has a frusto-conical shape, and an inner surface in the receiving slot includes a bottom surface and a lateral surface adjoining the bottom surface and the second surface, and the receiving slot tapers from the second surface to the bottom surface.

6. The fiber optic connector of claim 1, wherein the main body defines a central axis, and the main body comprise two body portions at two opposite sides of the central axis, the two body portions each defines two receiving hole, a fixing slot and a buffer slot, and the fixing slots is arranged at a side of the converging lens facing away from the central axis.

7. The fiber optic connector of claim 6, wherein the four receiving holes are symmetrically opposite to each other across the central axis.

8. The fiber optic connector of claim 1, wherein the at least one receiving hole is generally round or generally rectangular.

9. The fiber optic connector of claim 1, wherein the at least one receiving hole is one of a through hole and a blind hole.

10. The fiber optic connector of claim 1, wherein the at least one converging lens is integrally connected to the main body.

11. The fiber optic connector of claim 1, wherein the fiber optic connector is made of plastic.

12. A fiber optic assembly comprising:
   a complementary fiber optic connector comprising at least one fixing protrusion;
   a fiber optic connector comprising:
      at least one converging lens;
      a main body comprising a first surface and a second surface at two opposite sides thereof, the first surface defining at least one receiving hole for receiving at least one optical fiber, the at least one converging lens being arranged on the second surface and aligning with the at least one receiving hole, the second surface defining at least one receiving slot for fixedly receiving the at least one fixing protrusion of the complementary fiber optic connector and at least one buffer slot, the at least one buffer slot being located between the at least one converging lens and the at least one receiving slot, and being configured for allowing at least one portion of the main body between the at least one buffer slot and the at least one fixing hole to be bendable, such that precise alignment of the at least one converging lens and the at least one receiving slot is maintained.

13. The fiber optic assembly of claim 12, wherein the main body further comprises a third surface and a fourth surface opposite to the third surface, each of the third surface and the fourth surface is located between and adjoins the first surface and the second surface, the at least one buffer slot spans through the third surface and the fourth surface.

14. The fiber optic assembly of claim 13, wherein the at least one fixing slot spans through the third surface and the fourth surface.

15. The fiber optic assembly of claim 12, wherein a depth of the buffer slot is substantially equal to that of the receiving slot.

16. The fiber optic assembly of claim 12, wherein the receiving slot has a frusto-conical shape, and an inner surface in the receiving slot includes a bottom surface and a lateral surface adjoining the bottom surface and the second surface, and the receiving slot tapers from the second surface to the bottom surface.

17. The fiber optic assembly of claim 12, wherein the main body defines a central axis, and the main body comprise two body portions at two opposite sides of the central axis, the two body portions each defines two receiving hole, a fixing slot and a buffer slot, and the fixing slots is arranged at a side of the converging lens facing away from the central axis.

18. The fiber optic assembly of claim 12, wherein the at least one receiving hole is one of a through hole and a blind hole.

19. The fiber optic assembly of claim 12, wherein the protrusions are interferentially received in the respective fixing slots.

20. The fiber optic assembly of claim 12, wherein the fiber optic connector is made of plastic.

* * * * *